US012198847B2

(12) United States Patent
Mizukoshi

(10) Patent No.: US 12,198,847 B2
(45) Date of Patent: Jan. 14, 2025

(54) INDUCTOR

(71) Applicant: Murata Manufacturing Co., Ltd., Kyoto-fu (JP)

(72) Inventor: Yasutaka Mizukoshi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 770 days.

(21) Appl. No.: 17/461,614

(22) Filed: Aug. 30, 2021

(65) Prior Publication Data

US 2022/0115179 A1 Apr. 14, 2022

(30) Foreign Application Priority Data

Oct. 9, 2020 (JP) ................................ 2020-171236

(51) Int. Cl.

*H01F 27/28* (2006.01)
*H01F 27/24* (2006.01)
*H01F 27/29* (2006.01)

(52) U.S. Cl.

CPC ............. *H01F 27/29* (2013.01); *H01F 27/24* (2013.01)

(58) Field of Classification Search

CPC ...... H01F 27/29; H01F 27/24; H01F 27/2852; H01F 2017/048; H01F 17/04; H01F 27/2847

USPC ................................ 336/192, 200, 198, 232

See application file for complete search history.

(56) References Cited

U.S. PATENT DOCUMENTS

2013/0255071 A1* 10/2013 Muneuchi ............ H01F 27/292 29/605
2016/0126006 A1* 5/2016 Ahn ...................... H01F 27/306 29/606
2018/0182538 A1* 6/2018 Choi ....................... H01F 41/10
2018/0218825 A1* 8/2018 Sato .................... H01F 41/0233
2019/0272946 A1* 9/2019 Arai ........................ H01F 17/06

FOREIGN PATENT DOCUMENTS

JP 2010-177492 A 8/2010
JP 2017-120809 A 7/2017
JP 2019-153644 A 9/2019

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

An inductor includes a coil including a winding section in which a conductor having two opposite width surfaces is wound and extended sections extended from the winding section, an element body including a magnetic section in which the coil is embedded, the magnetic section including magnetic powder, and an outer electrode arranged on a surface of the element body and connected to the extended sections. The element body has first side surfaces opposite to each other. Each of the extended sections has a first zone approximately parallel with a corresponding one of the first side surfaces in one of the width surfaces of the conductor. The first zone is exposed from the first side surface and connected to the outer electrode. At least one of the extended sections includes a planar section meeting the first zone at an obtuse angle and extending to a tip of the extended section.

14 Claims, 2 Drawing Sheets

INDUCTOR

CROSS-REFERENCE TO RELATED APPLICATION

This application claims benefit of priority to Japanese Patent Application No. 2020-171236, filed Oct. 9, 2020, the entire content of which is incorporated herein by reference.

BACKGROUND

Technical Field

The present disclosure relates to an inductor.

Background Art

Japanese Unexamined Patent Application Publication No. 2017-120809 describes a surface mount inductor including a coil and a molded body incorporating the coil and formed by the use of a sealing member containing resin and a magnetic material. In that surface mount inductor, a surface of a conductor constituting an extended terminal of the coil is exposed to a surface of the molded body and is connected to an outer terminal made of conductive paste.

SUMMARY

A coil in an inductor may be made of a thick conductor to reduce a direct current resistance. In such a case, because of spring-back of the wound conductor, an extended section exposed from an element body may be partly separated from the element body at the time of shaping the element body, and this may cause a defect in the connection to an outer electrode. Accordingly, the present disclosure provides an inductor with satisfactory reliability of connection between an extended section of a coil and an outer electrode.

According to a first aspect of preferred embodiments, an inductor includes a coil, an element body, and an outer electrode. The coil includes a winding section in which a conductor having two opposite width surfaces is wound and a pair of extended sections extended from the winding section. The element body includes a magnetic section in which the coil is embedded, and the magnetic section includes magnetic powder. The outer electrode is arranged on a surface of the element body and connected to the extended sections. Each of the extended sections has a first zone approximately parallel with a corresponding one of opposite first side surfaces of the element body in one of the width surfaces of the conductor. The first zone is exposed from the first side surface and connected to the outer electrode. At least one of the extended sections further includes a planar section meeting the first zone at an obtuse angle and extending to a tip of the extended section.

According to a second aspect of preferred embodiments, an inductor includes a coil, an element body, and an outer electrode. The coil includes a winding section in which a conductor having two opposite width surfaces is wound and a pair of extended sections extended from the winding section. The element body includes a magnetic section in which the coil is embedded, and the magnetic section includes magnetic powder. The outer electrode is arranged on a surface of the element body and connected to the extended sections. The element body has a pair of first side surfaces opposite to each other. Each of the extended sections has a first zone approximately parallel with a corresponding one of the first side surfaces in one of the width surfaces of the conductor. The first zone is exposed from the first side surface and connected to the outer electrode. At least one of the extended sections further includes two curved sections curved oppositely to each other along its extension direction.

According to preferred embodiments of the present disclosure, an inductor with satisfactory reliability of connection between an extended section of a coil and an outer electrode can be provided.

Other features, elements, characteristics and advantages of the present disclosure will become more apparent from the following detailed description of preferred embodiments of the present disclosure with reference to the attached drawings.

DETAILED DESCRIPTION

Figure 1:
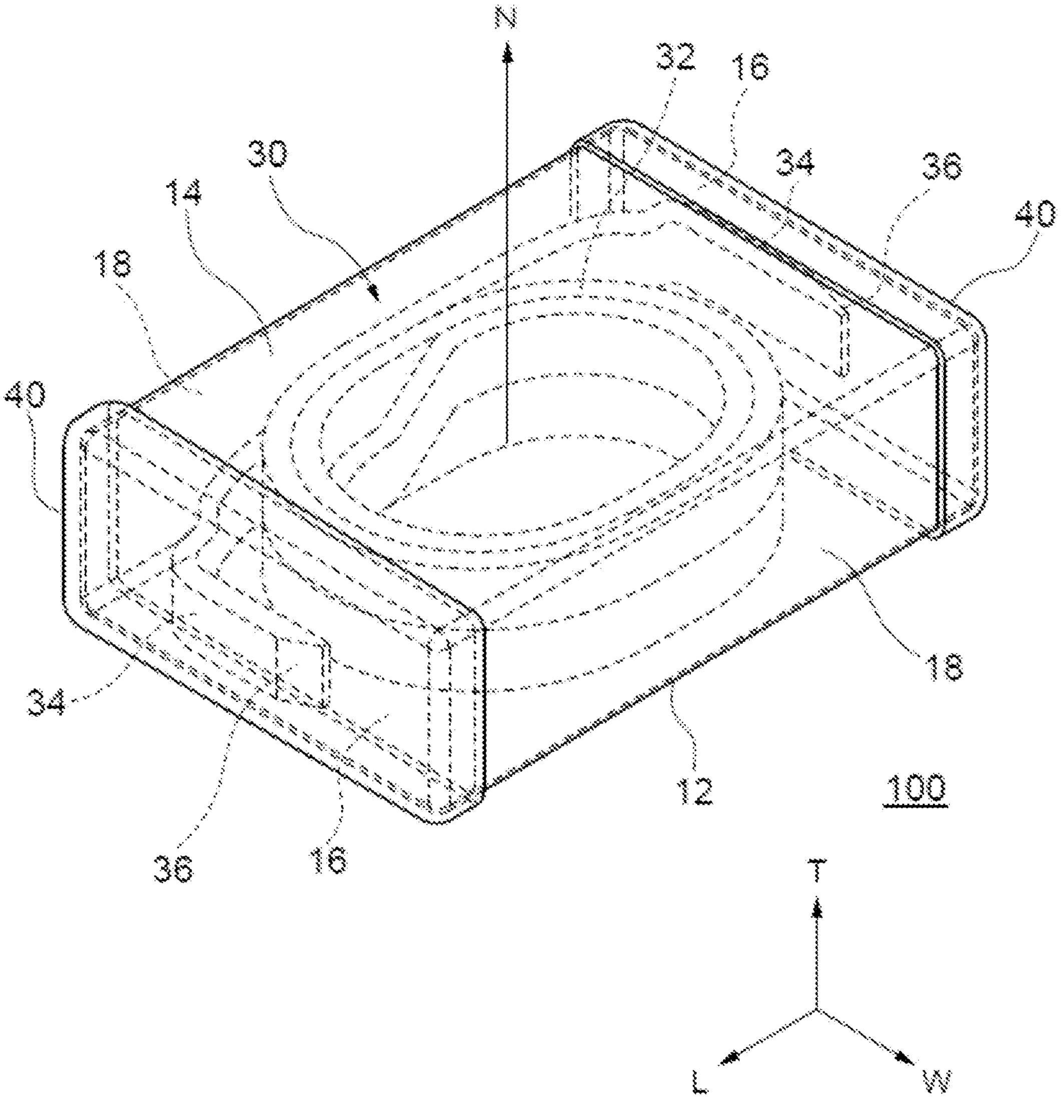
FIG. 1 is a partial see-through perspective view of an inductor according to a first embodiment seen from its second principal surface side.

An inductor according to a first aspect of preferred embodiments includes a coil, an element body, and an outer electrode. The coil includes a winding section in which a conductor having two opposite width surfaces is wound and a pair of extended sections extended from the winding section. The element body includes a magnetic section in which the coil is embedded, and the magnetic section includes magnetic powder. The outer electrode is arranged on a surface of the element body and connected to the extended sections. The element body has a pair of first side surface opposite to each other. Each of the extended sections has a first zone approximately parallel with a corresponding one of the first side surfaces of the element body in one of the width surfaces of the conductor. The first zone is exposed from the first side surface and connected to the outer electrode. At least one of the extended sections further includes a planar section meeting the first zone at an obtuse angle and extending to a tip of the extended section. At least one of the extended sections may include two curved sections curved oppositely to each other along its extension direction.

An inductor according to a second aspect of preferred embodiments includes a coil, an element body, and an outer electrode. The coil includes a winding section in which a conductor having two opposite width surfaces is wound and a pair of extended sections extended from the winding section. The element body includes a magnetic section in which the coil is embedded, and the magnetic section includes magnetic powder. The outer electrode is arranged on a surface of the element body and connected to the extended sections. The element body has a pair of first side surfaces opposite to each other. Each of the extended sections has a first zone approximately parallel with a corresponding one of the first side surfaces in one of the width surfaces of the conductor. The first zone is exposed from the first side surface and connected to the outer electrode. At least one of the extended sections further includes two curved sections curved oppositely to each other along its extension direction. At least one of the extended sections may include a planar section meeting the first zone at an obtuse angle and extending to a tip of the extended section.

Because the extended section includes the planar section meeting the first zone at the obtuse angle and extending to the tip of the extended section. That is, the thickness of the conductor decreases in the direction toward the tip of the extended section, and the magnetic section covers at least a portion of the planar section in the tip portion of the extended section at the time of shaping the element body. Therefore, the adhesion of the extended section and the element body can be improved, and the separation of the extended section from the element body can be suppressed. Thus, the reliability of connection between the extended section and the outer electrode can be improved. Because the extended section includes the first zone and the planar section, the area of connection to the outer electrode is increased, and the direct current resistance of the inductor can be reduced. Because the extended section includes the two curved sections, the area of the extended section exposed from the first side surface can be more increased. Thus, the reliability of connection between the extended section and the outer electrode can be improved, and the direct current resistance of the inductor can be more effectively reduced.

The planar section may have a second zone connected to the outer electrode and a third zone positioned in the tip and its vicinity of the extended section and embedded in the magnetic section. Because the tip of the extended section is embedded in the magnetic section, the separation of the extended section from the element body can be more effectively suppressed, and the reliability of connection between the extended section and the outer electrode can be more improved.

A ratio of a length of the first zone in its extending direction to a length of the first side surface in its width direction may be not less than about ⅓. Because the area of the extended section exposed from the first side surface is increased, the area of connection between the extended section and the outer electrode can be more increased, the reliability of connection can be improved, and the direct current resistance of the inductor can be more effectively reduced.

In the present specification, the term "steps" include not only an independent step but also a step whose intended purpose is accomplished even if it is indistinguishable from another step. Embodiments of the present disclosure are described below with reference to the drawings. The embodiments described below are merely examples of an inductor to embody a technical idea of the present disclosure, and the present disclosure is not limited to the inductor described below. Members described in the claims are never limited to members in the embodiments. In particular, the sizes, materials, shapes, relative arrangements of components described in the embodiments are not intended to limit the scope of the present disclosure to them unless otherwise specified and are merely examples for illustration. In the drawings, the same elements are denoted by the same reference numerals. The embodiments are separately illustrated for the sake of convenience in consideration of explanation of main points or ease of understanding, and configurations illustrated in different embodiments can be replaced or combined in part.

The present disclosure is specifically described below with reference to embodiments and is not limited to them.

Embodiments

Figure 2:
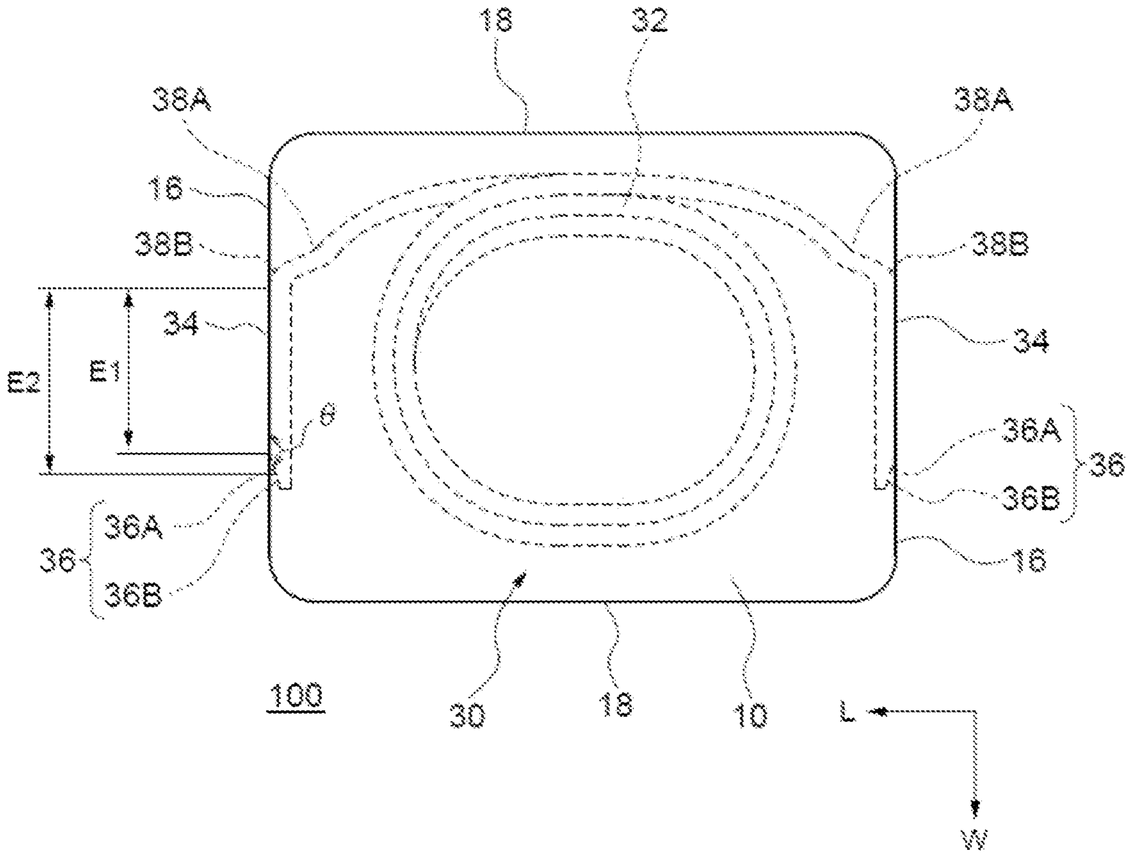
FIG. 2 is a partial see-through plan view of an element body included in the inductor according to the first embodiment seen from the second principal surface side.
Figure 3:
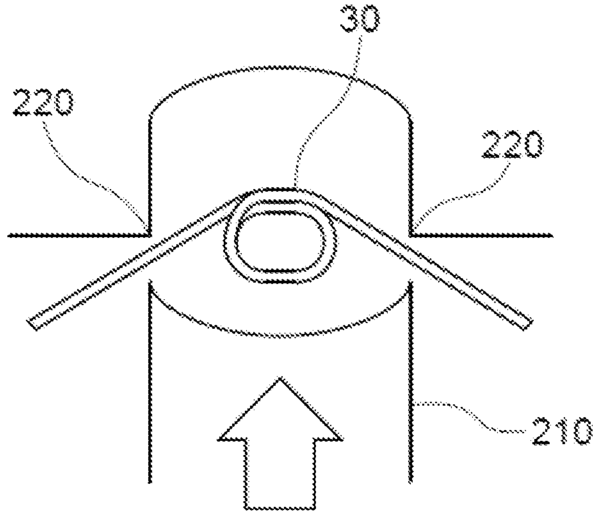
FIG. 3 is a schematic diagram for explaining an example of a method for manufacturing a coil included in the inductor according to the first embodiment.

An inductor according to an embodiment is described with reference to FIGS. 1 to 3. FIG. 1 is a partial see-through perspective view of an inductor 100 seen from its second principal surface side. FIG. 2 is a partial see-through plan view of an element body 10 included in the inductor 100 seen from the second principal surface side. FIG. 3 is a schematic diagram for explaining an example of a method for manufacturing a coil 30 included in the inductor 100. In FIG. 1, broken lines are used as additional lines for expressing curved planes in some part.

As illustrated in FIGS. 1 and 2, the inductor 100 includes the coil 30, the element body 10 including a magnetic section that includes magnetic powder and resin and in which the coil 30 is embedded, and a pair of outer electrodes 40 arranged on a surface of the element body 10 and electrically connected to the coil 30. The element body 10 has an approximately cuboid shape and has a first principal surface 12, a second principal surface 14, two first side surfaces 16, and two second side surfaces 18. The first principal surface 12 is a mounting surface. The second principal surface 14 is opposite to the first principal surface 12 in a height direction (T direction). The first side surfaces 16 are adjacent to the first principal surface 12 and the second principal surface 14, are approximately perpendicular to them, and are opposite to each other in a longitudinal direction (L direction). The second side surfaces 18 are adjacent to the first principal surface 12 and the first side surfaces 16, are approximately perpendicular to them, and are opposite to each other in a width direction (W direction). A conductor forming the coil 30 has two width surfaces opposite to each other in the thickness direction of the conductor, its cross section substantially perpendicular to its extension direction has an approximately rectangular shape defined by the width and thickness of the conductor, and it has a covering layer on its surface. The coil 30 has a winding section 32 and a pair of extended sections extended from the outermost location of the winding section 32. In the winding section 32, the conductor having the two width surfaces opposite to each other is wound about a winding axis N in two stages, one above the other, such that the width surfaces are approximately parallel with the winding axis N.

The winding section 32 in the coil 30 is the one in which both ends of the single conductor are in the outermost positions. One of the width surfaces defined by the width of the conductor is on the outer side, and the other width surface is on the inner side. The surfaces defined by the width of the conductor are approximately parallel with the winding axis. The conductor is spirally wound such that there is an overlap in at least a portion of the surfaces defined by the width of the conductor. The portions of the conductor in the innermost positions are joined together. The conductor is wound in two stages, with one above the other such that the surfaces defined by the thickness of the conductor are opposite to each other (so-called a winding). That is, the conductor in the upper stage of the winding section 32 is spirally wound from the outer region toward the inner region and is connected to the conductor in the lower stage in the innermost location, whereas the conductor in the lower stage is spirally wound from the inner region toward the outer region. The coil 30 is embedded in the element body 10 such that the winding axis N of the winding section 32 is approximately perpendicular to the first principal surface 12 and the second principal surface 14 of the element body 10.

The pair of extended sections in the coil 30 consists of a first extended section extended from the outermost location of the winding section in the upper stage and a second extended section extended from the outermost location of the winding section in the lower stage. Each of the extended sections in the coil 30 includes a first zone 34 being a portion thereof. The first zone 34 is approximately parallel with the corresponding first side surface 16 of the element body 10, and the extended section is embedded in the element body 10 such that the width surface of the conductor on the outer side in the winding section is exposed from the first side surface 16. Each of the extended sections includes a planar section 36 meeting the first zone 34 at an obtuse angle and extending to the tip of the extended section. That is, the extended section has a zone where the thickness of the conductor monotonously decreases in the direction from the line of intersection of the first zone 34 and the planar section 36 toward the tip of the extended section. The first side surface 16 of the element body 10 has a recessed section where the magnetic section is absent in accordance with the decrease in the thickness of the conductor and a second zone 36A being a portion of the planar section is exposed. In other embodiments, the second zone 36A may be embedded in the magnetic section.

As illustrated in FIG. 2, in the first zone 34, the width surfaces are approximately parallel with the first side surface 16 of the element body 10. The planar section 36, which is contiguous to the first zone 34, meets the first zone 34 at an angle θ, which is the obtuse angle. The planar section 36 includes the second zone 36A and a third zone 36B. The second zone 36A is contiguous to the first zone 34, is exposed from the first side surface 16, and is connected to the outer electrode. The third zone 36B is contiguous to the second zone 36A and is embedded in the magnetic section. That is, the tip of the extended section is embedded in the magnetic section. Because the third zone 36B, which is the tip of the extended section, is embedded in the magnetic section, the separation of the extended section from the element body can be more effectively suppressed. To more effectively suppress the separation, the angle θ may be not less than about 100°.

The first zone 34, which is exposed from the first side surface 16, has a length E1 in the W direction, which is substantially parallel with the first side surface 16, and is connected to the outer electrode (not illustrated). An example of the ratio of the length E1 of the first zone 34 to the length of the first side surface 16 in the W direction may be not less than about ⅓, and may be not less than about ½. When the length of the first zone is not less than a predetermined value, the resistance of connection to the outer electrode can be more reduced. The extended section has the first zone 34 and the second zone 36A as an exposed section exposed from the first side surface 16 of the element body 10 and connected to the outer electrode, and the exposed section has a length E2 in the W direction, which is substantially parallel with the first side surface 16. An example of the ratio of the length E2 to the length of the first side surface 16 in the W direction may be more than about ⅓, and may be not less than about ½. When the length of the exposed section is not less than a predetermined value, the resistance of connection to the outer electrode can be more reduced.

The extended section has two curved sections curved oppositely to each other directions along the extension direction between the location where it is extended from the winding section 32 and the first zone 34. As illustrated in FIG. 2, the conductor extended from the winding section 32 includes a first curved section 38A and a second curved section 38B along the extension direction, the first curved section 38A is curved on the width surface side being the outer side in the winding section, and the second curved section 38B is curved on the width surface side being the inner side in the winding section. Thus, the length of the first zone can be more increased while the spring-back can be suppressed, and the resistance of connection between the coil and the outer electrode can be more reduced.

In the inductor 100, as illustrated in FIG. 1, each of the outer electrodes 40 is arranged on the five surfaces consisting of the first principal surface 12, the first side surface 16, the second side surfaces 18, and the second principal surface 14 of the element body 10 and is connected to the first zone 34, which is in the extended section of the coil 30 and is exposed at the first side surface 16. The recessed section in the first side surface 16 is filled with conductive resin forming the outer electrode, and the second zone 36A in the planar section and the outer electrode 40 are connected together by means of that resin. The outer electrode 40 may be a conductive resin layer containing conductive particles, such as silver particles or copper particles, and binding resin. The outer electrode 40 may further include a plating layer on the conductive resin layer. An example of the plating layer may include a layer made of nickel and a layer made of tin disposed thereon. The zone where the outer electrode is disposed may be a magnetic-powder exposed zone where a portion of the resin included in the element body and a portion of an insulating layer covering the surface of the magnetic powder are removed from the surface of the element body. In the magnetic-powder exposed zone, some magnetic powder coupled together forms a network structure, and the surface roughness is large. Thus, when the outer electrode includes the conductive layer, the adhesion to the element body is improved, and when it includes the plating layer, the plating can be easily grown.

Example dimensions of the element body 10 are described below. An example length L may be not less than about 1 mm and not more than about 3.4 mm (i.e. from about 1 mm to about 3.4 mm), preferably not less than about 1 mm and not more than about 3 mm (i.e., from about 1 mm to about 3 mm). An example width W may be not less than about 0.5 mm and not more than about 2.7 mm (i.e., from about 0.5 mm to about 2.7 mm), preferably not less than about 0.5 mm and not more than about 2.5 mm (i.e., from about 0.5 mm to about 2.5 mm). An example height T may be not less than about 0.5 mm and not more than about 2 mm (i.e., from about 0.5 mm and to about 2 mm), preferably not less than about 0.5 mm and not more than about 1.5 mm (i.e., from about 0.5 mm to about 1.5 mm). Examples of specific dimensions L×W×T of the element body may include about 1 mm× about 0.5 mm× about 0.5 mm, about 1.6 mm× about 0.8 mm× about 0.8 mm, about 2 mm× about 1.2 mm× bout 1 mm, and about 2.5 mm× about 2 mm× about 1.2 mm.

The magnetic section included in the element body 10 is composed of a composite material containing magnetic powder and resin. Examples used as the magnetic powder may include iron-based metal magnetic powder, such as Fe, Fe—Si, Fe—Ni, Fe—Si—Cr, Fe—Si—Al, Fe—Ni—Al, Fe—Ni—Mo, or Fe—Cr—Al, metal magnetic powder based on other composition, amorphous or similar metal magnetic powder, metal magnetic powder whose surface is covered with an insulating layer, such as glass, metal magnetic powder with a reformed surface, and nanoscale minute metal magnetic powder. Examples used as the resin may include thermosetting resin, such as epoxy resin, polyimide resin, or phenol resin, and thermoplastic resin, such as polyethylene resin, polyamide resin, or liquid crystal polymer. An example area proportion of the magnetic powder in the magnetic section may be not less than about 50% and not more than about 85% (i.e., from about 50% to about 85%), preferably not less than about 60% and not more than about 85% (i.e., from about 60% to about 85%) or not less than about 70% and not more than about 85% (i.e., from about 70% to about 85%). The area proportion can be determined by dividing the total area of the magnetic powder existing in a predetermined zone in a central portion of a cross section extending through the center of the inductor along the longitudinal direction by the area of the predetermined zone.

An example thickness of the conductor forming the coil may be not less than about 0.01 mm and not more than about 1 mm (i.e., from about 0.01 mm to about 1 mm). An example width of the conductor may be not less than about 0.1 mm and not more than about 2 mm (i.e., from about 0.1 mm to about 2 mm). An example aspect ratio (width/thickness) of the conductor in the cross section may be not less than about 1/1 or may be not less than about 1/1 and not more than about 30/1 (i.e., from about 1/1 to about 30/1). The covering layer covering the conductor may be a layer made of insulating resin, such as polyimide or polyamide-imide, and having an example thickness of not less than about 2 μm and not more than about 20 μm (i.e., from about 2 μm to about 20 μm). A fusion layer containing a self-fusion component of, for example, thermoplastic resin or thermosetting resin may be further disposed on the surface of the covering layer. The fusion layer may have a thickness of not less than about 1 μm and not more than about 8 μm (i.e., from about 1 μm to about 8 μm). When the fusion layer is disposed, the untying of the winding section can be more effectively suppressed.

A protective layer may be arranged on the surface of the element body 10. The protective layer may be arranged on the surface of the element body other than the zone where the outer electrodes are arranged or may be arranged on the surface of the element body other than the zone where the first zones in the extended sections are exposed. An example of the protective layer may contain resin. Examples used as the resin included in the protective layer may include thermosetting resin, such as epoxy resin, polyimide resin, or phenol resin, and thermoplastic resin, such as acryl resin, polyethylene resin, or polyamide resin. The protective layer may contain filler. As the filler, nonconductive filler, such as silicon oxide or titanium oxide, may be used. An example of the protective layer may be formed by applying a resin composite containing the resin and the filler to the surface of the element body by a means, such as dipping, and, as needed, curing the applied resin. The protective layer may be made of an inorganic material, such as water glass. The protective layer may be disposed in a zone other than the magnetic-powder exposed zone.

A mark (not illustrated) may be provided to the element body. An example of the mark may be provided to the second principal surface of the element body in the vicinity of the extended section extended from the winding section in the lower stage and may indicate the polarity of the inductor. An example of the marker may be provided by printing, laser engraving, or another processing.

Method For Manufacturing Inductor

A method for manufacturing an inductor is described below. An example of the inductor can be manufactured by a method including a coil forming step of forming a coil by winding a conductor, and a cutting step of cutting a tip portion of an extended section of the formed coil to adjust the coil to a predetermined length. The method further includes an element body forming step of shaping an element body including a magnetic section in which the coil is embedded by exposing the tip portion (first zone) of the extended section in the formed coil, embedding it into a composite material containing metal magnetic powder and resin, and performing pressing by means of a metal die or another tool. Also, the method includes an outer electrode forming step of forming an outer electrode to be connected to the tip portion of the extended section exposed at a surface of the element body.

The tip portion of the extended section of the coil may be cut by using, for example, a coil holding section including a cutting blade 220 and a counter blade 210, as illustrated in FIG. 3. Specifically, the planar section is formed in the tip of the extended section by housing the winding section of the coil 30 in the coil holding section and cutting the extended section of the coil 30 with the counter blade 210 and the cutting blade 220 obliquely with respect to the extension direction of the conductor. An example case where the inductor including the outer electrode arranged on the five surfaces consisting of a portion of the first principal surface, a portion of the second principal surface, portions of the second side surfaces, and the first side surface of the element body is described above. In another case, the outer electrode may be disposed on a portion of the first principal surface and at least a portion of the first side surface of the element body. Only one of the extended sections may have the planar section meeting the first zone at the obtuse angle and extending to the tip of the extended section. Only one of the extended sections may have the two curved sections curved oppositely to each other along the extension direction. The cross section of the conductor substantially perpendicular to the extension direction is substantially rectangular in the above-described case, and that shape is not limited to being substantially rectangular. Examples of the shape of that cross section may include a shape having a chamfered edge and a shape having a curved side, such as a substantially semicircular side or a substantially semielliptical side. Examples of the shape of the winding section in the coil seen from the winding-axis direction may further include shapes other than a substantially oblong shape, such as a substantially circular shape, a substantially elliptical shape, or a substantially polygonal shape with chamfered vertexes. In the zone where the outer electrodes are not arranged in the first principal surface of the element body, a recessed section (standoff) may be disposed. The shape of the recessed section in the first principal surface in the thickness T direction seen from the width W direction may be substantially semicircular.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

a coil including a winding section, in which a conductor having two opposite width surfaces is wound, and a pair of extended sections extended from the winding section;

an element body including a magnetic section in which the coil is embedded, the magnetic section including magnetic powder; and an outer electrode arranged on a surface of the element body and connected to the extended sections, wherein the element body has a pair of first side surfaces opposite to each other, each of the extended sections has a first zone approximately parallel with a corresponding one of the first side surfaces in one of the width surfaces of the conductor, the first zone is exposed from the first side surface and connected to the outer electrode, and at least one of the extended sections includes a planar section meeting the first zone at an obtuse angle at an end of the first zone which is exposed from the first side surface and extending to a tip of the extended section.

2. The inductor according to claim 1, wherein at least one of the extended sections extends along an extension direction and includes two curved sections curved oppositely to each other along the extension direction.

3. An inductor comprising:

a coil including a winding section in which a conductor having two opposite width surfaces is wound and a pair of extended sections extended from the winding section;

an element body including a magnetic section in which the coil is embedded, the magnetic section including magnetic powder; and an outer electrode arranged on a surface of the element body and connected to the extended sections, wherein the element body has a pair of first side surfaces opposite to each other, each of the extended sections has a first zone approximately parallel with a corresponding one of the first side surfaces in one of the width surfaces of the conductor, the first zone is exposed from the first side surface and connected to the outer electrode, and at least one of the extended sections extends along an extension direction and includes two curved sections curved oppositely to each other along the extension direction, a first one of the curved sections curving inward toward the winding section and a second one of the curved sections curving outward toward the first side surface.

4. The inductor according to claim 3, wherein at least one of the extended sections includes a planar section meeting the first zone at an obtuse angle and extending to a tip of the extended section.

5. The inductor according to claim 1, wherein the planar section has a second zone connected to the outer electrode, and a third zone positioned in the tip and its vicinity of the extended section and embedded in the magnetic section.

6. The inductor according to claim 1, wherein a ratio of a length of the first zone in an extending direction of the first zone to a length of the first side surface in a width direction of the first zone is not less than about ⅓.

7. The inductor according to claim 2, wherein the planar section has a second zone connected to the outer electrode, and a third zone positioned in the tip and its vicinity of the extended section and embedded in the magnetic section.

8. The inductor according to claim 4, wherein the planar section has a second zone connected to the outer electrode, and a third zone positioned in the tip and its vicinity of the extended section and embedded in the magnetic section.

9. The inductor according to claim 2, wherein a ratio of a length of the first zone in an extending direction of the first zone to a length of the first side surface in a width direction of the first zone is not less than about ⅓.

10. The inductor according to claim 3, wherein a ratio of a length of the first zone in an extending direction of the first zone to a length of the first side surface in a width direction of the first zone is not less than about ⅓.

11. The inductor according to claim 4, wherein a ratio of a length of the first zone in an extending direction of the first zone to a length of the first side surface in a width direction of the first zone is not less than about ⅓.

12. The inductor according to claim 5, wherein a ratio of a length of the first zone in an extending direction of the first zone to a length of the first side surface in a width direction of the first zone is not less than about ⅓.

13. The inductor according to claim 7, wherein a ratio of a length of the first zone in an extending direction of the first zone to a length of the first side surface in a width direction of the first zone is not less than about ⅓.

14. The inductor according to claim 8, wherein a ratio of a length of the first zone in an extending direction of the first zone to a length of the first side surface in a width direction of the first zone is not less than about ⅓.

* * * * *